United States Patent [19]

Brownell

[11] 4,235,611

[45] Nov. 25, 1980

[54] AIR FILTER

[75] Inventor: Peter Brownell, Exeter, R.I.

[73] Assignee: Fram Corporation, East Providence, R.I.

[21] Appl. No.: 32,084

[22] Filed: Apr. 23, 1979

[51] Int. Cl.³ .............................................. B01D 50/00
[52] U.S. Cl. ......................................... 55/309; 55/322; 55/324; 55/337
[58] Field of Search ............... 55/337, 324, 309, 322, 55/323

[56] References Cited

U.S. PATENT DOCUMENTS

| | | | |
|---|---|---|---|
| 1,337,564 | 4/1920 | Orem | 55/323 |
| 3,078,650 | 2/1963 | Anderson et al. | 55/337 |
| 3,384,241 | 5/1968 | Nostrand | 55/487 |
| 3,494,114 | 2/1970 | Nelson et al. | 55/498 |
| 3,508,383 | 4/1970 | Humbert, Jr. et al. | 55/337 |
| 3,616,617 | 11/1971 | Groote | 55/337 |
| 3,757,892 | 9/1973 | Raudman, Jr. | 55/324 |
| 3,853,512 | 12/1974 | Hayashi | 55/351 |
| 3,876,400 | 4/1975 | Frantz | 55/337 |
| 3,898,066 | 8/1975 | Miskiewicz | 55/509 |
| 3,907,529 | 9/1975 | Borsheim | 55/399 |
| 4,038,058 | 7/1977 | Miskiewicz | 55/502 |
| 4,162,905 | 7/1979 | Schuler | 55/337 |

FOREIGN PATENT DOCUMENTS 408853 2/1968 Australia ................................. 55/337
2322990 11/1974 Fed. Rep. of Germany ............ 55/337

Primary Examiner—Tim R. Miles
Attorney, Agent, or Firm—Ken C. Decker; William N. Antonis

[57] ABSTRACT

A heavy duty automotive air cleaner for use in environments having high contaminant concentrations includes a housing carrying a vane-type centrifugal separator and a removable filter cartridge. The removable filter cartridge includes a pleated paper filtering medium and a fibrous, depth-type filtering medium. A pair of flow paths are defined through the housing between the inlet and outlet thereof. One of the flow paths extends through the depth-type media and the pleated paper medium, and the other flow path extends through the centrifugal vane-type separator and the pleated paper medium. The depth-type fibrous medium is placed upstream from the pleated paper medium, and is adapted to remove relatively fine particles from the incoming air stream as the heavier particles are centrifuged outwardly by the vane-type separator.

6 Claims, 2 Drawing Figures

AIR FILTER

BACKGROUND OF THE INVENTION

This invention relates to a heavy duty automotive air cleaner for use in operating environments with high contaminant concentrations.

A common heavy duty air cleaner design for use in environments with high contaminant concentrations typically provides a centrifugal separator in series with a filter cartridge containing, typically, a pleated paper medium. Such a prior art air cleaner design is disclosed in U.S. Pat. No. 3,508,383. In air cleaners of this type, entering air is subjected to the centrifugal separator so that the heavier particles are centrifuged radially outwardly with respect to the air cleaner housing and therefore drop from the flow stream. The flow stream then communicates to the pleated paper medium in the filter element, where most of the remaining particles are removed. One problem associated with air cleaners of this type is their relatively limited capacity, and the fact that they are relatively inefficient in removing smaller particulate matter.

The present invention solves the problems inherent in the prior art heavy duty air filter designs by providing a pair of flow paths which extend through the filter housing between the inlet and outlet. One of the flow paths extends through a centrifugal vane-type separator. Although only some of the air is communicated through the separator, the spiral flow-inducing effects of the separator are also felt upstream of the turning vanes themselves, and accordingly knock out heavier particles from all, or almost all, or the air entering the air cleaner. The air flow communicated through the centrifugal separator then communicates through a pleated paper filtering medium. The other flow path extends through a depth-type, fibrous filtering medium which is located upstream of the turning vanes and which is adapted to remove finer particulate matter from the entering air stream. The air flow communicated through the depth-type medium then communicates through the pleated paper medium. Since the depth-type medium will plug gradually until the differential required to draw air through the depth-type medium is equal to that necessary to draw air through the centrifugal separator, at which time the loaded depth-type or fibrous filter medium will become almost imperforate, and thereafter all of the flow communicates through the centrifugal separator. However, the entire pleated paper element is utilized, even that portion of the pleated paper element in series with the depth-type medium after the medium plugs, because the air communicates at relatively low velocity between the pleats of the pleated paper medium, thus assuring loading of the entire pleated paper medium.

SUMMARY OF THE INVENTION

In general, the invention provides an air filter having a housing including an inlet and an outlet with a first filtering medium for filtering larger particles from the air and a second filtering medium for filtering smaller particles from the air. Mechanism is provided for inducing a spiral flow component into at least some of the air communicated between the inlet and outlet. A pair of separate flow paths are provided to communicate the inlet with the outlet. One of the flow paths communicates through the first and second media and bypasses said spiral flow component inducing mechanism, and the other flow path communicates through the spiral flow component inducing mechanism and the first filtering medium.

Therefore, an advantageous effect of the invention is to increase the capacity of heavy duty air cleaners for use in environments with relatively high contaminant concentrations as compared to the capacity of air filters of similar size known to the prior art.

Another advantageous effect of the invention is to permit a heavy duty air cleaner to remove finer particles from the entering air flow as compared to air cleaners known to the prior art.

Still another advantageous effect of the invention is to provide two parallel flow paths in a heavy duty air cleaner which extend through the air cleaner housing, one of the flow paths communicating through a centrifugal separator and a pleated paper medium, and the other flow path communicating through a depth-type fibrous filtering medium and through a pleated paper medium.

DETAILED DESCRIPTION

Figure 1:
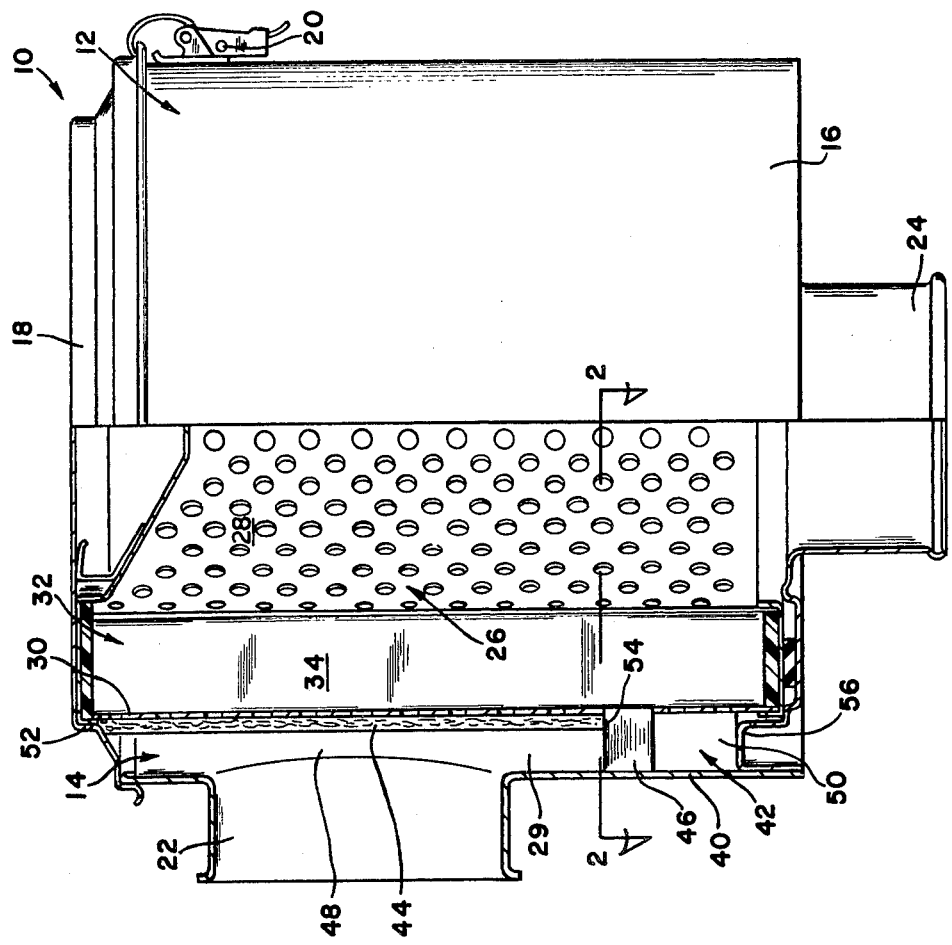
FIG. 1 is a view, partly in section, of an air cleaner made pursuant to the teachings of my present invention.
Figure 2:
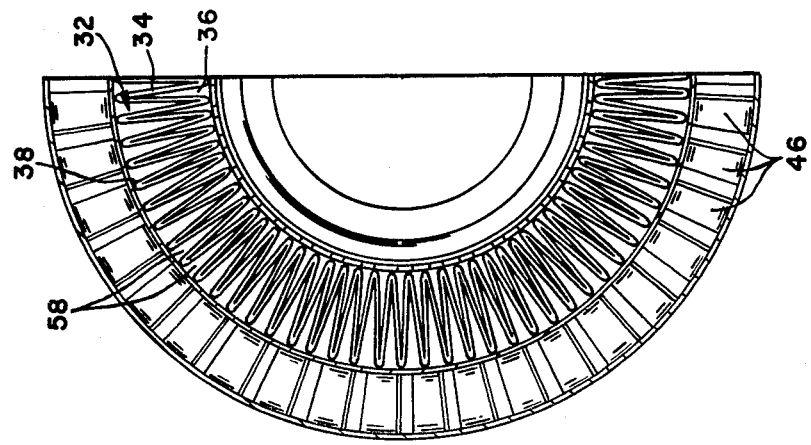
FIG. 2 is a cross-sectional view taken substantially along lines 2—2 of FIG. 1.

Referring now to the drawings, a heavy duty air cleaner generally indicated by the numeral 10 includes a housing generally indicated by a numeral 12 comprising a cannister 16 having an open end 14 covered by a removable cover 18. Circumferentially spaced clamps 20 around the periphery of the cannister 16 are provided to hold the cover 18 on the cannister. The container 12 is provided with an inlet 22 which communicates with the ambient air and an outlet 24 which communicates with the carburetor inlet of the vehicle engine.

A removable filter element generally indicated by the numeral 26 is received within the cannister 16 through the open end 14 which is closed by the cover 18. The filter element 26 comprises a circumferentially extending inner screen 28, a concentric, circumferentially extending outer screen 30, which cooperates with the inner screen 28 to define an annular compartment 32 therebetween. A filtering medium 34 is located in the compartment 32, and comprises a circumferentially extending array of radially tapering pleats of appropriate, conventional filter paper. The inner and outer tips 36, 38 respectively lie adjacent the corresponding inner and outer screen 28, 30. The circular-shaped compartment defined by the inner screen 28 is communicated with the outlet 24. The outer screen 30 cooperates with the outer wall 40 of the cannister 16 to define an annular chamber 42 therebetween, which communicates with the inlet 22. A circumferentially extending belt of a fibrous, depth-type filtering media 44 of a conventional type well-known to those skilled in the art is mounted on the outer screen 35 and extends completely around the filter element 26. A centrifugal separator, comprising a circumferentially extending array of turning vanes 46, is also located in the compartment 42 and divides the latter into an upper section 48 communicates with the inlet 22 and into a lower section 50. The depth-type filtering medium 44, therefore, extends continuously along the screen 30 between the upper end 52 of the filter element 26 and the inlet 54 to the vanes 46. Accordingly, the depth-type filtering medium 44 defines the inner circumferentially extending wall of the upper section 46 of the compartment 42.

The vanes 46 circumscribe the filter element 26, are of a conventional type, and are capable of inducing a spiral flow component to the air communicated into the compartment 42. Although only a portion of the air is normally forced through the vanes 46, the spiral flow-inducing effect of the vanes, as demonstrated by tests, has an effect above the entrance of the vanes in the inlet portion 48 of the compartment 42. Accordingly, the effect of the vanes 44 not only is felt by the air flow passing through the vanes but is also felt by the air communicated in the inlet 22, as will be discussed in detail hereinbelow, that does not pass through the vanes. The location of the vanes axially within the compartment 42 must be chosen so that there is enough distance between the outlet of the vanes and the lower end 56 of the cannister 16 to permit induction of the spiral flow component, but must be low enough to maximize the surface area of the depth-type filtering media 44 facing the section 46 of the compartment 42.

MODE OF OPERATION

When the air filter 10 is installed in an automotive vehicle, ambient inlet air is communicated through the inlet 22 into the upper section 46 of the inlet compartment 42. Air in the section 48 can choose between one of two parallel paths to communicate to the outlet 24. One of the paths extends through the fibrous, depth-type media 44 which circumscribes the screen 30 and defines one of the walls in the section 48 of compartment 42, and continues through that portion of the pleated paper 34 which is located above (viewing the Figure) the inlet to the turning vanes 46. The other path, in parallel to the first path, extends through the vanes 46, through the lower section 50 of the compartment 42, and that portion of the pleated paper 34 below (viewing the Figure) the inlet to the vanes 54. Although obviously the effect of the vanes 54 will be to induce a spiral flow component into the air communicated through them, as discussed hereinabove, tests have conclusively demonstrated that the air assumes a spinning action prior to actual entry into the turning vanes, and, accordingly, the air in the section 42 of compartment 46 which faces the depth-type fibrous filtering media 44 is subjected to this spinning action, which causes the heavier particles to be centrifuged radially outwardly toward the wall 40 of the cannister 16, from which they thereupon drop to the bottom of the housing and out of the flow stream. A portion of the air will then communicate through the first flow path comprising the fibrous filtering media 44 and the pleated paper 34 to the outlet 24. The depth-type fibrous filter medium 44 is such that it can capture and hold relatively fine particles which might pass through the pleated paper filtering medium 34. The remainder of the air passes through the turning vanes 44 and through the section 50 to the pleated paper medium 34, and from there to the outlet 24.

As the filter element 26 is used, the depth-type fibrous filtering media 44 will gradually plug because of the particles removed from the air stream and entrained in the medium until the pressure differential across the depth-type media 44 and pleated paper 34 is equal to that necessary to draw the air through the turning vanes 44. At this point the loaded depth-type media will become almost imperforate, and substantially all of the air flow communicated through the inlet 22 will be communicated through the turning vanes 44.

Of course, after the media 44 becomes imperforate, the pleated paper medium 34 above the entrance to the turning vanes through which air communicated through the now imperforate depth-type media 44, may be relatively unloaded. Because all of the air through the inlet is now forced through the turning vanes 46, tests have shown that at least some air communicates through the channels 58 defined between the pleats 60 of the pleated paper 34. Of course, this upwardly communicating air (viewing the Figure) will have a very low face velocity. Accordingly, due to the lower face velocity, the pleated paper 34 may be more heavily loaded than would be possible with a higher face velocity than would occur if air were communicated directly from the inlet chamber section 46 of compartment 42 to the pleated paper.

Accordingly, the capacity of the air filter made pursuant to the present invention is increased over the same size air filter known in the prior art by (1) the weight of the dust assimilated by the depth-type fibrous filtering material 44; (2) removal of the fine dust particles by the depth-type media which might pass completely through the prior art filter; (3) the higher loading of the portion of the pleated paper medium 34 above the entrance of the turning vanes 44 due to the fact of the relatively low velocity of the air communicated upwardly in the channels between the pleats of the pleated paper medium 34; and (4) the removal of the fine particles by the depth media prior to the air's entry into the portion of the pleated paper medium above the entrance to the vanes.

I claim:

1. In an air filter, a housing defining a chamber therewithin, an annular filter cartridge in said chamber having a circumferentially extending permeable outer wall cooperating with the wall of the housing to define an annular inlet compartment therebetween within said chamber, inlet means for communicating air into said inlet compartment, said annular filter cartridge defining an outlet compartment, outlet means for communicating air from said outlet compartment after the air has passed through said filter cartridge, means in said inlet compartment circumscribing said permeable outer wall of said cartridge and extending transversely across said inlet chamber between the wall of the housing and said permeable outer wall for inducing a spiral flow component to at least a portion of the air communicated through said inlet and dividing said inlet compartment into one section upstream from said spiral flow inducing means and another section downstream from said spiral flow inducing means, said inlet communicating with said upstream section, said filter cartridge including a first filtering medium for filtering larger particles from the air communicated to said housing and a second filtering medium separate from said filtering medium for filtering finer particles from the air communicated to said housing, said second filtering medium being carried on said permeable outer wall of said filter cartridge, said upstream section and said first and second filtering media defining a first flow path between said inlet and outlet, said upstream section, said spiral flow inducing means, said downstream section, and at least one of said filtering media defining a second flow path between said inlet and outlet in parallel with said first flow path.

2. The invention of claim 1:

where said spiral flow inducing means comprises a circumferentially extending array of turning vanes.

3. The invention of claim 1:
wherein said annular filter cartridge comprises an inner screen defining said outlet compartment, said permeable outer wall being an outer screen cooperating with said housing to define said inlet compartment, said first filtering medium being pleated paper located between said screens.

4. The invention of claim 3:
wherein the opposite ends of said upstream section of the inlet compartment are defined by the spiral flow inducing means and by a corresponding end of the housing, and said second filtering medium extends continuously on said outer screen between said corresponding end and said spiral flow inducing means.

5. The invention of claim 4:
wherein said first flow path closes and substantially all of the air communicates through said second flow path when the pressure drop across said second filtering medium exceeds the pressure drop through said spiral flow inducing means so that thereafter substantially all of the air is communicated through the second flow path.

6. The invention of claim 5:
wherein said pleated paper is located on one side of said outer screen and a portion of the pleated paper faces said second filtering medium mounted on the other side of said outer screen, said pleated paper defining flow channels between said pleats whereby air communicated through said second flow path communicates to said portion of the pleated paper facing said second filtering medium after said first flow path closes.

* * * * *